United States Patent

Sykes

[15] 3,663,151
[45] May 16, 1972

[54] APPARATUS FOR USE IN FORMING PIPES

[72] Inventor: Malcolm Sykes, Lanark, England

[73] Assignee: London and Russell Limited, Newmains, Wishaw, England

[22] Filed: Oct. 30, 1969

[21] Appl. No.: 872,488

[30] Foreign Application Priority Data

Nov. 26, 1968 Great Britain......................55,995/68

[52] U.S. Cl. ..................................425/327, 25/11, 25/127 R
[51] Int. Cl.............................................................B28b 21/54
[58] Field of Search............................25/30 R, 39, 127 R, 11

[56] References Cited

UNITED STATES PATENTS

| 2,554,011 | 5/1951 | Clark et al. | 25/39 |
| 2,401,232 | 5/1946 | Ponahey | 25/30 X |
| 3,383,743 | 5/1968 | Cotton | 25/39 |
| 3,273,216 | 9/1966 | Gourlie | 25/39 X |

FOREIGN PATENTS OR APPLICATIONS

| 630,047 | 10/1949 | Great Britain | 25/39 |
| 972,518 | 7/1959 | Germany | 25/39 |

Primary Examiner—J. Spencer Overholser
Assistant Examiner—Ben D. Tobor
Attorney—Mason, Fenwick & Lawrence

[57] ABSTRACT

In an extruder for manufacturing clay pipes, a socketed end portion of each pipe is formed by an annular mould which is positioned at the extruder outlet during moulding and withdrawn after moulding to permit extrusion of the pipe. The shoulder portion of the mould is attached to the extruder mouth, whereas the mould core and the mould side-wall are withdrawable, the side-wall being movable axially relative to the core by means of pneumatic actuators so that a downward movement of the side-wall may be effected for the purpose of shearing off waste clay extruded through a gap between the lower end of the side-wall and an outwardly presented flange on the core. Where the extruder is adapted to produce bends, the rapid withdrawability of the side-wall allows increased production rate in respect of "quick bends." The removal of waste clay extruded through the mould is effected more rapidly than hitherto in the production of both straight pipes and bends.

6 Claims, 3 Drawing Figures

Inventor
MALCOLM SYKES
By
Mason, Fenwick & Lawrence
Attorneys

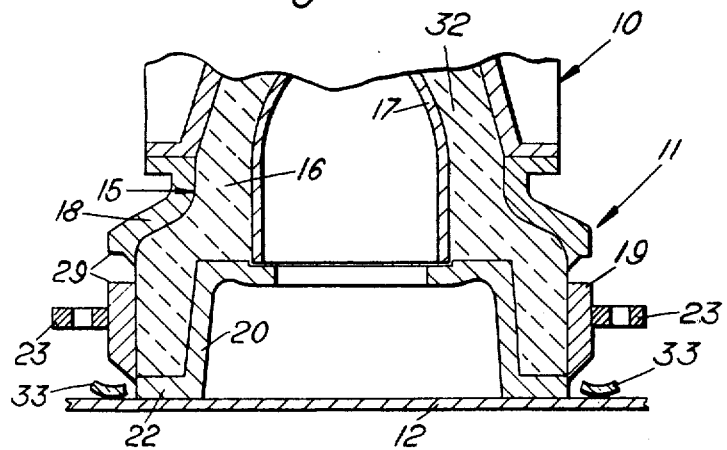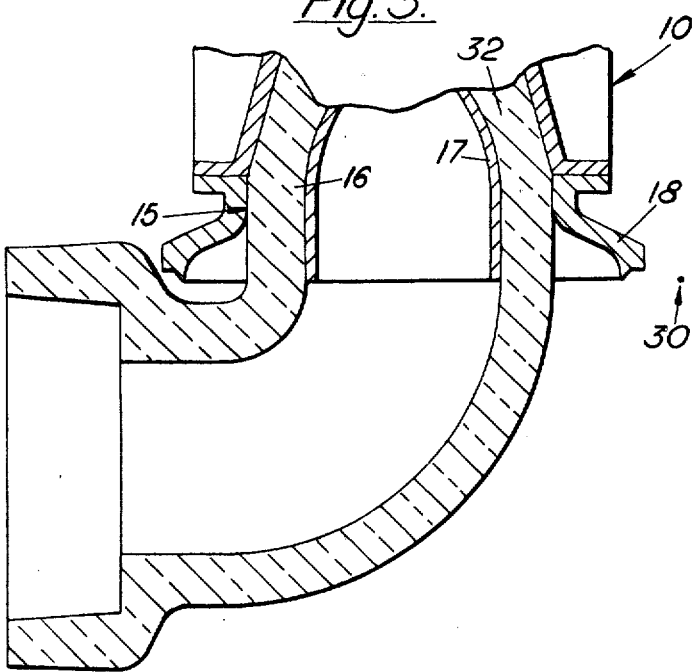

APPARATUS FOR USE IN FORMING PIPES

This invention relates to earthenware pipe making machines for forming socketed ends on pipes.

The invention is especially, but not exclusively, applicable in the manufacture from clay of drainage pipes and associated fittings such as bends and traps each of which has an enlarged end portion or socket into which the plain end of another pipe may be inserted for the purpose of establishing a joint or connection.

According to the present invention, there is provided an earthenware pipe making machine for forming socketed ends on the pipes, comprising an extruder having an outlet for forming a pipe from soft clay, moulding means for receiving soft clay under pressure from the extruder outlet to form the socketed end, said moulding means comprising a first mould portion secured to the extruder outlet and defining the outer surface configuration of the shoulder portion of the socketed end, a second mould portion co-operable with the first mould portion, to form a continuation thereof and defining the outer surface configuration of a substantially straight portion of the socketed end, a core defining the configuration of the inner surface of the socketed end, a platform carrying the core and the second mould portion, and a support whereon the platform is shiftable axially of the extruder outlet.

An embodiment of the invention will now be described, by way of example, with reference to the drawings in which:

FIG. 2 is a sectional elevation similar to part of FIG. 1 but showing a different stage of operation, and FIG. 3 is a sectional view on the line III—III in FIG. 1 and shows another different stage of operation.

Figure 1:
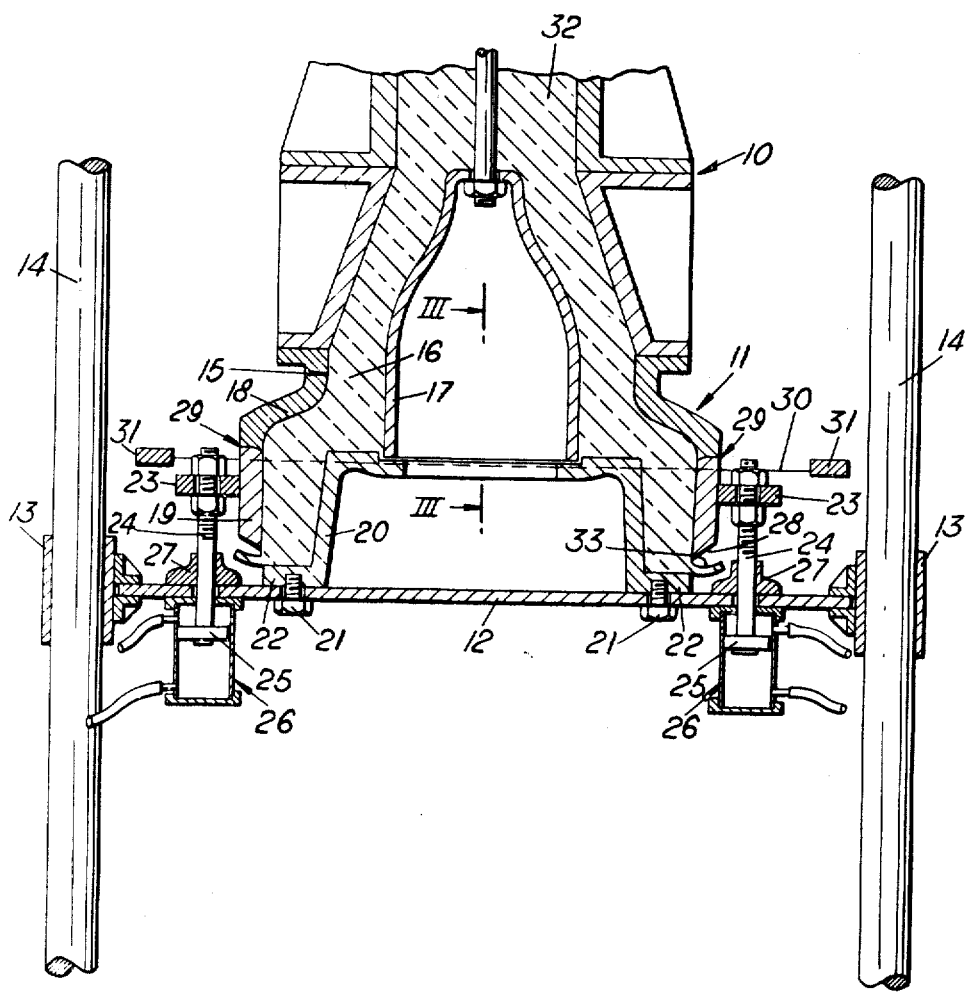
FIG. 1 is a sectional elevation showing part of an earthenware pipe making machine in accordance with the present invention for forming, from clay, drainage pipes having socketed ends.

In FIG. 1 of the drawings, an earthenware pipe making machine for use in forming, from clay-drainage pipes having socketed ends consists of an extruder part of which is indicated at 10, moulding means indicated generally at 11, and a shiftable platform 12 which is carried by diametrically opposed sliding brackets 13 on a support in the form of parallel columns 14.

More particularly, the extruder 10 has an outlet at 15 capable of forming a pipe of circular cross-section by virtue of a circular mouth 16 and a concentric center or bell 17. The moulding means consists of a first mould portion in the form of a flared extension 18 of the outlet 15, a second wall portion in the form of a circular collar 19, and a circular core 20, these parts of the moulding means being capable of mutually co-operating with the outlet 15 to define a mould for forming a socketed end as shown in FIG. 1. The core 20 is secured to the platform 12 concentric with the outlet 15 by means of screws 21 which engage the underside of a flange 22, the latter being part of the core 20 and serving as a mould bottom defining an end face of the socket. The collar 19 is mounted on the platform 12 concentric with the core 20 by means of external lugs 23, these lugs being apertured to receive threaded rods 24 secured to the pistons 25 of double-acting pneumatic actuators 26 mounted on the underside of the platform 12. The rods 24 are slidable in guides 27 so that operation of the actuators 26 may effect upwards and downwards movement of the collar 19 axially with respect to the core 20. In FIG. 1, the collar 19 is shown in a first position, raised with respect to the core 20, so that there is an annular gap between the periphery of the flange 22 and a lower end face 28 of the collar 19. The end face 28 is bevelled to form an inner cutting edge. An upper end face of the collar 19 mates with the outer end face of the wall portion 18 at 29, the point of transition from the shoulder to the straight sides of the socket. A pipe cutter-wire 30 stretched between the legs of a U-shaped carrier 31 serves to separate an extruded pipe from the extruder, the carrier 31 being mounted on appropriate guides (not shown) and moved across by a pneumatic actuator (not shown).

In operation, with the moulding means initially arranged as shown in FIG. 1, the extruder 10 is operated for a period sufficient to fill the mould space with clay, the annular gap at the lower end of the collar 19 allowing ventilation of the mould space. During the moulding period, clay is extruded through the gap to form a fringe of waste material, the gap width having been pre-set according to the size of socket being formed, to cause a back-pressure consistent with proper moulding. A trip-switch or other sensor may be located a short distance from the gap for the purpose of detecting the extruded fringe and signalling a control unit to mark the completion of the moulding. In FIG. 1, clay is indicated at 32, and the fringe of waste material at 33.

When moulding is complete, the actuators 26 are operated to lower the collar 19 to a second position, as shown in FIG. 2, in which the gap is closed and the fringe 33 sheared off by the inner cutting edge at the lower end face of the collar 19. This operation need only take a fraction of one second.

Immediately thereafter, the extruder effects extrusion of clay through the outlet 15 to form a pipe, the downward force of the extruding clay pushing the platform 12 downwards towards a further trip or sensor (not shown) positioned according to the length of pipe required, the platform 12 being counterbalanced so as to respond readily to the push of the clay without causing unwanted deformation of the pipe formed. When the platform has reached its lower second position, the extruder is stopped, and the cutter-wire 30 is moved across to separate the pipe from clay remaining in the extruder. The pipe, complete with its enlarged end portion is then removed from the apparatus for further processing (glazing, firing, etc.). The cycle of operations is repeated after raising the platform 12 and the collar 19 to their respective initial positions.

Where the extruder 10 is provided with an adjustable baffle around the bell 17, bends may be produced by adjusting the baffle to cause a greater flow of clay towards one side of the opening 15. Such a baffle is described in British Pat. Specification No. 630,047. A bend thus produced is illustrated in FIG. 3 and it may be seen that the vertical distance between the outlet 15 and the lower end face of the wall portion 18 allows the formation of a "quick bend," i.e. a bend of relatively small radius. Hitherto, the collar 19 has been formed integrally with the wall portion 18, so that the bend radius required to be greater in order to bring the formed socket clear of the lower end of the collar. Previous proposals have sought to mitigate this problem by providing a split mould having a hinge at one side and a fastener diametrically opposite the hinge, the mould thus being capable of being opened and the halves thereof swung clear of the formed socket prior to forming a bend. The time taken to unfasten and later re-fasten the split collar is eliminated as a result of the present invention, so allowing a notable increase in production rate in the manufacture of pipe bends. The rapid removal of the fringe of waste material contributes to increased production rate in the manufacture of bends as well as straight pipes.

It is to be understood that, in apparatus in accordance with the present invention, the platform 12 may be moved by an actuator, this arrangement being preferable in manufacturing bends. It will be understood that in manufacturing bends, the extruder is stopped momentarily while the platform 12 and the parts of the moulding means thereon moves clear of the extruder outlet.

In the above-described embodiment, the collar 19 is preferably provided with a slightly tapered bore in order to facilitate withdrawal of the collar from the moulded clay socket. It is envisaged, however, that a parallel bore may be used successfully.

In examples of modifications of the above-described embodiment, the flange 22 is omitted, the platform 12 serving as a mould bottom, in which case the waste material would be parted off rather than sheared off; the pneumatic actuators are replaced by hydraulic or electromagnetic actuators, or, alternatively, by a mechanical linkage arranged to provide the required movement of the collar 19; the columns 14 are replaced by a movable carrier, for example a central ram below the platform 12; the bell 17 is shortened, the core 20 being provided with a concentric upward projection defining an end portion of the pipe bore and co-operable with the lower end face of the shortened bell; the extruder opening and/or the moulding means are other than circular, for example of generally square or generally rectangular or oval cross-section; the opening 15 is provided with indents for the purpose of forming a pipe having a ribbed outer wall surface.

It is to be understood that apparatus in accordance with the present invention may be used in forming, from a plastic material, associated fittings such as are known by the terms, for example "heart heads," "grid boxes," and "access boxes." Such fittings may have only a relatively short length of extruded pipe formed integrally therewith after the main portion has been formed by moulding, the extruder being operated after moulding only for a time sufficient to bring the moulded portion clear of the extruder outlet so that the cutter-wire (30) may be operated to part off the fitting.

I claim:

1. An earthenware pipe making machine for forming socketed ends on the pipes, comprising an extruder outlet for extruding a pipe of soft clay, moulding means for receiving soft clay under pressure from the extruder outlet to form the socketed end, said moulding means comprising a first mould portion secured to the extruder outlet and defining the outer surface configuration of the shoulder portion of the socketed end, a second mould portion co-operable with the first mould portion to form a continuation thereof and defining the outer surface configuration of a substantially straight portion of the socketed end, a core defining the configuration of the inner surface of the socketed end, a platform carrying the core and the second mould portion, and a platform supporting means supporting said platform and said second mould means for movement axially of the extruder outlet so as to move the core and second mould portion axially with respect to the extruder and the first mould portion.

2. An earthenware pipe making machine according to claim 1, wherein the said second mould portion is mounted on supporting means shiftable on the platform relative to the core axially of the extruder outlet.

3. An earthenware pipe making machine according to claim 1, wherein the core has an outwardly presented flange defining an end face of the socketed end.

4. An earthenware pipe making machine according to claim 3, wherein the said outwardly presented flange together with the second mould portion define mutually co-operable shear cutters.

5. An earthenware pipe making machine according to claim 1, wherein the second mould portion and the core are tapered in order to facilitate their withdrawal from a socketed end after moulding.

6. An earthenware pipe making machine according to claim 1, wherein the extruder includes means for producing bends.

* * * * *

UNITED STATES PATENT OFFICE
CERTIFICATE OF CORRECTION

Patent No. 3,663,151    Dated May 16, 1972

Inventor(s)  Malcolm Sykes

It is certified that error appears in the above-identified patent and that said Letters Patent are hereby corrected as shown below:

The first word of the assignee is changed to read -- Loudon --.

Signed and sealed this 5th day of September 1972.

(SEAL)
Attest:

EDWARD M. FLETCHER, JR.            ROBERT GOTTSCHALK
Attesting Officer                  Commissioner of Patents